United States Patent [19]
Domingo

[11] Patent Number: 6,094,362
[45] Date of Patent: Jul. 25, 2000

[54] SWITCHED-MODE POWER CONVERTER WITH TRIPLE PROTECTION IN A SINGLE LATCH

[75] Inventor: Reynaldo P. Domingo, Kembangan Court, Singapore

[73] Assignee: Compaq Computer Corporation, Houston, Tex.

[21] Appl. No.: 09/128,064

[22] Filed: Aug. 3, 1998

[30] Foreign Application Priority Data

Apr. 1, 1998 [SG] Singapore ............................. 9800685

[51] Int. Cl.[7] ................................................. H02M 3/335
[52] U.S. Cl. ................................................. 363/21; 363/56
[58] Field of Search ........................... 363/18, 19, 20, 363/21, 39, 50, 56, 97

[56] References Cited

U.S. PATENT DOCUMENTS

| | | |
|---|---|---|
| 4,428,015 | 1/1984 | Nesler . |
| 4,428,016 | 1/1984 | Brasfield . |
| 5,412,556 | 5/1995 | Marinus . |
| 5,675,485 | 10/1997 | Seong ........................................ 363/97 |
| 5,687,066 | 11/1997 | Cook, II ................................... 363/89 |
| 5,774,347 | 6/1998 | Nakanishi ................................ 363/21 |
| 5,818,670 | 10/1998 | Ahn .......................................... 361/18 |
| 5,835,361 | 11/1998 | Fitzgerald ................................ 363/21 |

*Primary Examiner*—Edward H. Tso
*Assistant Examiner*—Gary L. Laxton
*Attorney, Agent, or Firm*—Fletcher, Yoder & Van Someren

[57] ABSTRACT

A single overvoltage, overcurrent, and overtemperature protection circuit for use in an off-line switched-mode power converter using current-mode pulse-width modulation control. A single latch circuit provides shutdown control via either voltage or current inputs of the pulse-width modulator.

24 Claims, 4 Drawing Sheets

SWITCHED-MODE POWER CONVERTER WITH TRIPLE PROTECTION IN A SINGLE LATCH

BACKGROUND AND SUMMARY OF THE INVENTION

This invention is related to overvoltage, overcurrent, and overtemperature protection in switching power supplies.

The prior art techniques for overvoltage, overcurrent, and overtemperature protection are implemented using separate circuits. Each method is discussed below.

Background: Switched-Mode Power Converters

Switched-mode power converters have many applications in industry including television and monitor power supplies. The basic application is a power supply (DC output) which achieves its output regulation by means of one or more active power handling devices which are switched ON or OFF. Because the switching device, for example a switching transistor, is fully OFF or fully ON at any one time, it dissipates very little energy, and so runs coolly and efficiently. The ratio of the on-time to the off-time of the switch (duty-cycle) is varied to suit the load demand. When little energy is required, the switch dwells in the ON position for only a short time during each cycle of operation. This short on-time is used to briefly "top off" an inductive and/or capacitive reservoir which supplies the load during the switch's off period. When the load's energy demand increases, a feedback/monitoring circuit automatically increases the duty-cycle of the switch so that it remains ON for a longer period of time in each operating cycle, and increases the energy fed to the reservoir. In this way, the energy drawn from the primary power source (usually AC mains) almost exactly matches the energy demanded by the load from instant to instant, with minimal energy waste within the power supply itself.

This type of supply is distinguished from a "linear" or "dissipative" power supply, in which regulation is achieved by power handling devices whose conduction is varied continuously over a wide range, and whose state is seldom (if ever) in a full OFF or full ON condition.

Background: Overvoltage Protection Techniques

Overvoltage ("OV") protection is normally accomplished using a large Zener diode connected across the output (VOUT and GND, in FIG. 1). During an OV fault, the Zener clamps the output to a safe voltage level and in the process draws excessive current which eventually fails to a short circuit. Correct sizing of the Zener in terms of clamping level and power dissipation is critical, because there is the danger of the Zener failing (open circuit) due to an excessive power surge. A condition may also occur where the Zener sustains its clamped mode longer than necessary and dissipates enough heat to affect operation of nearby components. Additionally, the Zener may even exceed the maximum allowable temperature rating of the printed circuit board itself.

Background: Overtemperature Protection Techniques

Overtemperature ("OT") protection is obtained using a temperature-sensitive resistor which changes in value proportional to temperature, and is connected in a voltage divider circuit. The circuit is biased by a fixed reference voltage. Changes in resistance value are translated to a change in voltage output. The output is then used to drive a comparator/driver circuit which feeds a secondary-side control loop configured to turn off the supply when an overtemperature fault occurs. The additional comparator/driver circuit adds to the complexity and cost of the circuit.

Background: Overcurrent Protection Techniques

Overcurrent ("OC") protection can be implemented in either the secondary or primary circuit. In the case of flyback topology design using current-mode pulse-width modulation ("PWM"), overload protection is performed in the primary by forcing the auxiliary supply (VAUX, in FIG. 1) to the PWM control circuit (U1) to decay to its Under Voltage Lock-Out ("UVLO") voltage level by closely coupling its auxiliary winding to the main secondary output voltage (VOUT). This low cost scheme does not offer fast response during an output short circuit condition, and allows higher power dissipation to the switching devices (Q3 and CR3). Although the standard 384X series of current-mode PWM ICs have an inherent pulse-by-pulse current limit feature, this is insufficient to provide complete overcurrent protection because it does not completely shutdown converter operation.

Alternatively, OC protection can be accomplished using a current-sense resistor or current-sense transformer connected along the secondary output current path, and as part of a complex trigger circuit. Either of these circuits offer accuracy and better response than the aforementioned but are rather costly and complex.

Switched-Mode Power Converter with Triple Protection in a Single Latch

This application discloses a single circuit comprising protection against overvoltage, overcurrent, and overtemperature in an off-line switched-mode power converter. The unified protection circuit meets the need for a simple and low-cost multiple protection circuit for an off-line Switched-Mode Power Supply ("SMPS") design which uses PWM control (preferably current-mode PWM control). A single latch element (preferably a bistable device structure, such as a thyristor-connected PNP+NPN pair) provides PWM control for all three protection circuit functions. Any of the three abnormal conditions can set the latch element, and the latch element will shut down the PWM controller when it is set. Preferably the latch is reset, once set, by timing elements which combine with one of the PWM outputs.

An advantage is that the circuit is ideally suited to work with the industry standard 384X-series of current-mode PWM controllers typically used in a flyback converter. Another advantage is that the circuit is easily implemented because it allows independent triggering of the latch driver from all three abnormal conditions. Another advantage is that it uses the minimum number of low cost components while providing full protection from overvoltage, overcurrent, and overtemperature conditions. Another advantage is that the circuit reacts much faster to a short circuit condition, thereby significantly reducing the power dissipation of the switching device. Another advantage is that the reduction in thermal load translates into improved device reliability.

To implement the three basic circuit protection functions of overvoltage, overcurrent, and overtemperature in a unified circuit by conventional methods would require a minimum dual comparator IC, dual-level reference voltages, an optoisolator to couple the fault signal to the primary circuit, and a number of resistors and capacitors. The set of components adds cost, occupies more space, and decreases circuit reliability. However, in a flyback design, reduced cost can be achieved by using individual protection circuits for each protection function, and may be implemented in both the primary and secondary sides of the circuit. The problem when using such scheme is performance degradation.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Flyback Power Converter Overview

"Flyback" converters are a class of power converter topology which are common in off-line adapters (e.g. in battery chargers). During the power transistor on time, energy is stored in a power transformer while load current is supplied from an output filter capacitor. When the power transistor turns off, the energy stored in the power transformer is transferred to the output as load current, and to the filter capacitor to replenish the charge lost when it alone was delivering load current.

Figure 1:
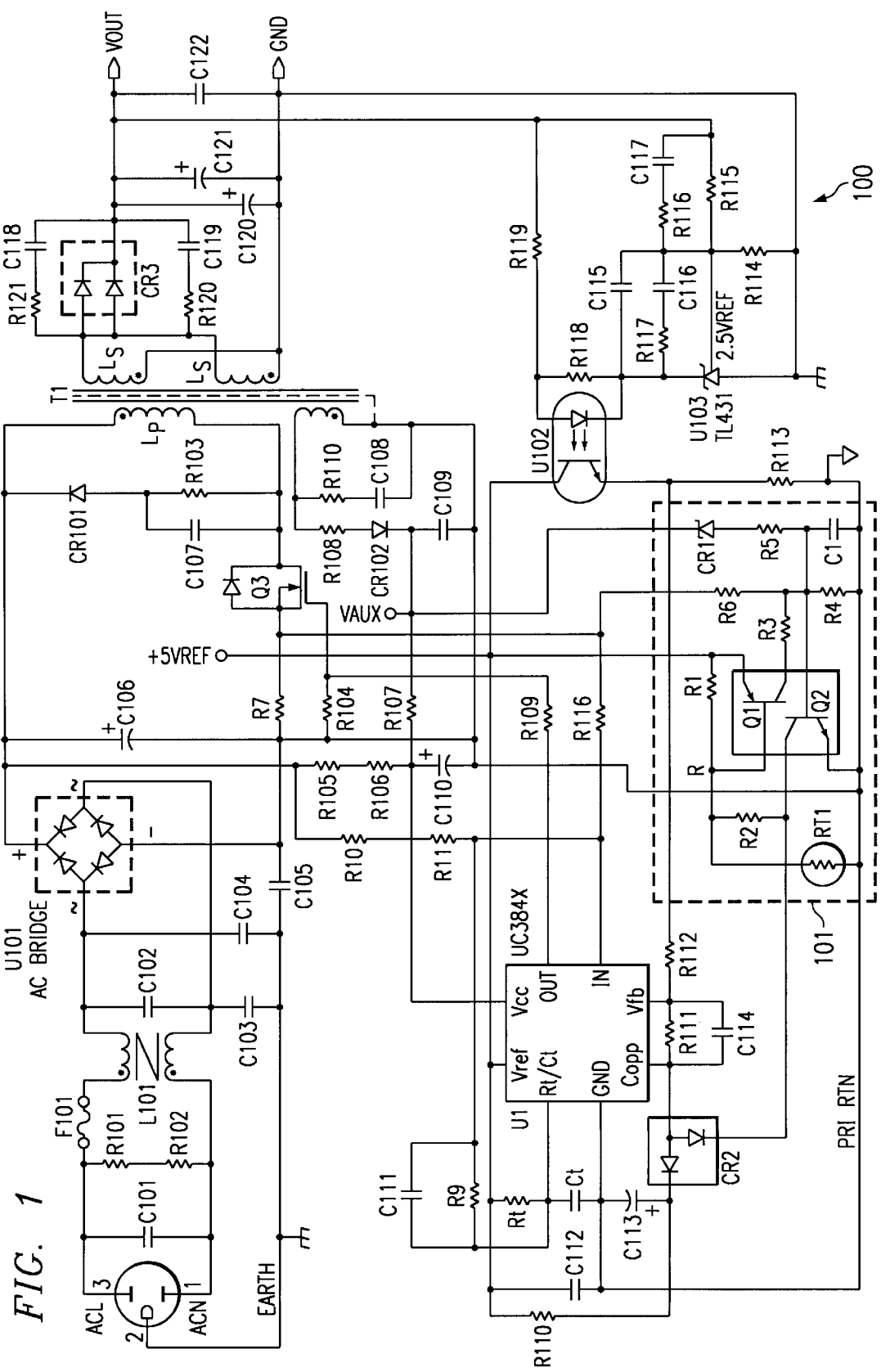
FIG. 1 shows a circuit diagram of a power converter according to the presently preferred embodiment.

In this configuration, as shown in FIG. 1, a switching transistor Q3 switches the primary $L_P$ of a transformer T1. Each of the secondary windings $L_S$ of the transformer T1 is connected through flyback diodes CR3 to an output capacitor C122. Thus, while the switching transistor Q3 is ON, the current through the primary increases (storing energy in the transformer), and when the switch Q3 is opened, the stored energy is discharged at the transformer secondary through the flyback diodes CR3. Feedback is provided through the optoisolator U102 to the PWM chip U1.

The Unified Protection Circuit

The heart of the all-in-one protection circuit 101 is the sense and latch circuit combination using resistive-divider circuits and two general-purpose bipolar transistors (in a monolithic package) configured to allow regenerative feedback. FIG. 1 shows a circuit diagram of a power circuit according to the presently preferred embodiment (a typical off-line flyback topology SMPS design using current-mode PWM control). Chip U1 is the PWM control IC (which among its functions) has a primary current-sense input pin (Is, pin 3) used to control the primary peak current. Additionally, together with its internal PWM comparator and latch circuits, chip U1 indirectly controls the output voltage constant. Resistors R1, R2, R3, R4, and transistors Q1 and Q2 form a discrete implementation of a latch circuit biased by a +5-volt reference +5VREF from chip U1. Adding thermistor RT1 at the junction of R1, R2, and base pin of Q1, forms the OT sense circuit.

During an OT condition, the power supply is cycled ON and OFF until the power supply temperature decreases to an acceptable level. However, if the condition persists, driving the temperature back up, the cycling will continue. Thermistor RT1 resistance decreases to a value sufficient to cause the voltage at node R junction of R1, R2, and base of Q1) to decrease to approximately 4.3V. This drops approximately 0.7 volt across the base-emitter of Q1, effectively turning it ON. During this time, voltage reference +5VREF is applied to the base of transistor Q2 through resistors R3 and R4, turning Q2 ON as well. Transistor Q2 then pulls the base voltage of Q1 (through R2) even lower, ensuring its ON state (latched mode), and at the same time pulling voltage at the cathode of diode CR2 to the voltage level of PRI RTN, forward biasing diode CR2. This brings the COMP pin (pin 1) of U1 low, effectively stopping the operation of U1 and the converter. This condition will persist until reference +5VREF decays to zero, when UVLO level of U1 is reached, and the latch circuit is reset. The power supply then cycles ON and OFF until the OT condition is removed.

During an OV condition, the power supply will cycle ON and OFF until the AC mains power is removed. However, during the cycling, the converter is protected from catastrophic failure (the main switching components blowing up) due to the reduced power dissipation. The OV condition is sensed by Zener CR1 which is sized according to the desired OV level. For flyback topology designs, the output voltages track one another through the coupled windings, such that it allows the use of the primary referenced VAUX to provide secondary OV protection. The threshold level for OV detect is the sum of the Vbe of Q2, the small voltage drop across R5, and the CR1 Zener voltage. The threshold level voltage, when multiplied by the transformer (T1) turns ratio, provides the desired main output OV level. When diode CR1 conducts sufficient current to make transistor Q2 Vbe reach approximately 0.7 volt, Q2 turns ON and pulls the base of transistor Q1 low to turn it ON. Transistor Q1 then provides the latching current. Diode CR2 is again forward biased pulling chip U1 COMP pin low, thereby shutting down PWM operation and the converter.

During an OC condition, the power supply will cycle ON and OFF until the fault is removed. Again, the converter is protected from catastrophic failure due to the reduced power dissipation. For current-mode PWM control, the primary peak current is sensed and converted to voltage through R7 in the circuit diagram. The low level voltage across R7 is used by U1 (pin 3) through R116 as an input to its internal PWM comparator. By connecting R6 between the base of Q2 and the output of R7, the overcurrent-sense circuit is created. For the standard 384X series of PWM ICs, the maximum voltage input at the current sense input (Is) pin 3 to indicate maximum peak current, is approximately 1.0 volt. At this level, the converter will be in a worst case maximum output power condition. Chip U1 will be at the verge of pulse-by-pulse current limiting. To provide adequate noise margin for Q2 and prevent false triggering of the latch circuit at full load, resistor R7 is sized such that at the peak output load condition, the voltage across it is less than the minimum VbeON of transistor Q2 at the maximum operating temperature. Additionally, capacitor C1 filters noise. Resistor R9 along with R10 and R11, provide voltage compensation to pin 3 of U1 and restores the 1.0 V limit. Thus during the OC (or short circuit) condition, the resulting voltage across R7 will turn transistor Q2 ON (through R6) and activate the latch circuit. The circuit reacts much faster to a short circuit condition, and thereby significantly reduces the power dissipation of the switching device. This reduction in thermal load translates into improved reliability.

Computer Embodiment

Figure 2:
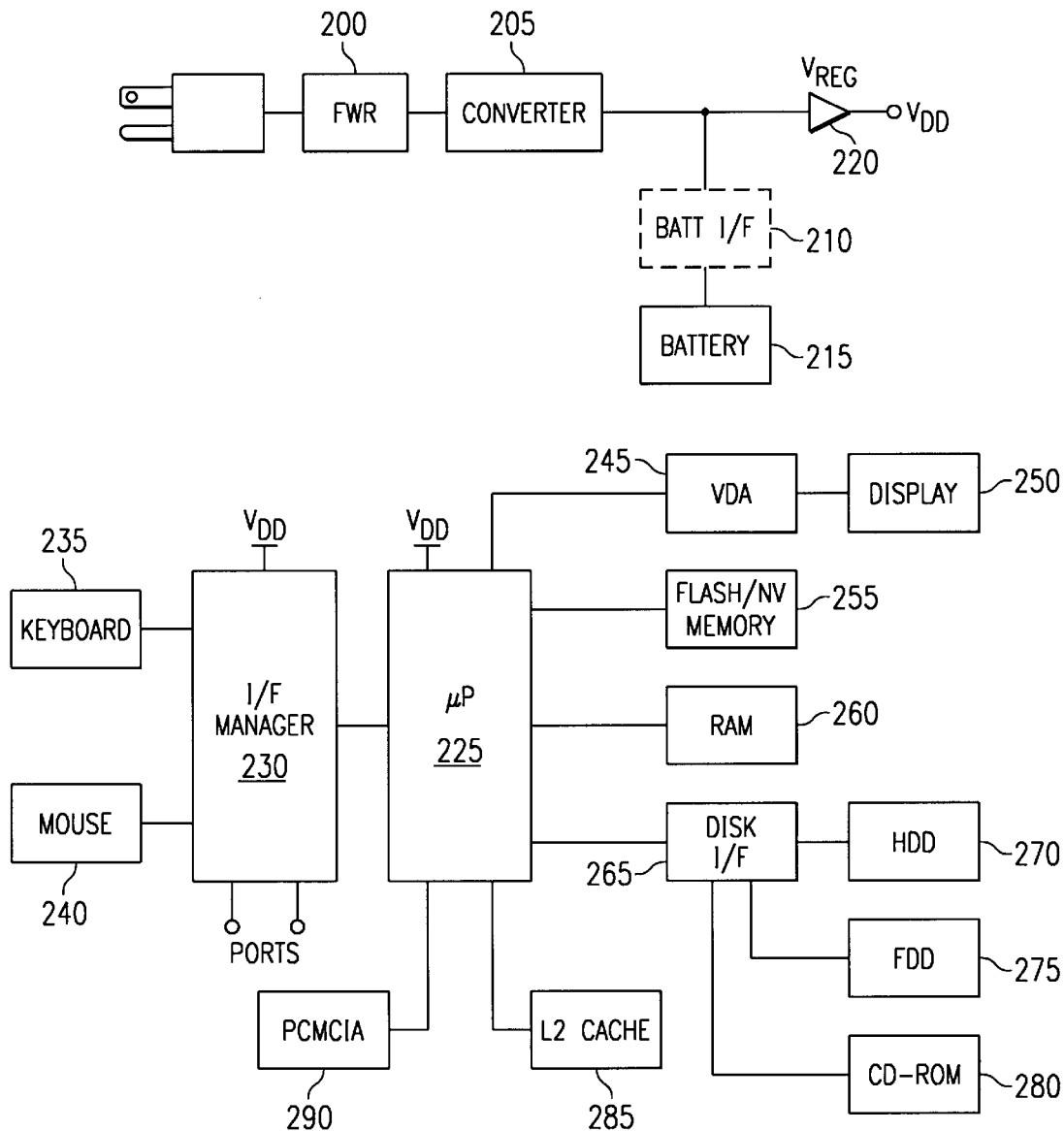
FIG. 2 shows a block diagram of a portable computer system according to the presently preferred embodiment.

FIG. 2 shows a portable computer utilizing the innovative protection architecture. The system includes a power converter 205 which is used to charge a battery 215. Optionally, a battery interface 210 is interposed between the battery and the rest of the circuitry. The power converter 205 is connected, through a fullwave bridge rectifier, 200, to draw power from AC mains, and is connected to provide a DC voltage to the battery 215. The battery 215 (or the converter 205), connected through a voltage regulator 220, is able to power the complete portable computer system, which includes in this example:

user input devices (e.g. keyboard 235 and mouse 240);

at least one microprocessor 225 which is operatively connected to receive inputs from said input device, through an interface manager chip 230 (which also provides an interface to the various ports);

a memory (e.g. flash or non-volatile memory 255 and RAM 260), which is accessible by the microprocessor;

a data output device (e.g. display 250 and video display adapter card 245) which is connected to output data generated by the microprocessor 225; and a magnetic disk drive 270 which is read-write accessible, through an interface unit 265, by the microprocessor 225.

Optionally, of course, many other components can be included, and this configuration is not definitive by any means. For example, the portable computer may also include a CD-ROM drive 280 and floppy disk drive ("FDD") 275 which may interface to the disk interface controller 265. Additionally, L2 cache 285 may be added to speed data access from the disk drives to the microprocessor, and a PCMCIA 290 slot accommodates peripheral enhancements.

Normal Operation and Fault Condition Waveforms

Figure 3:
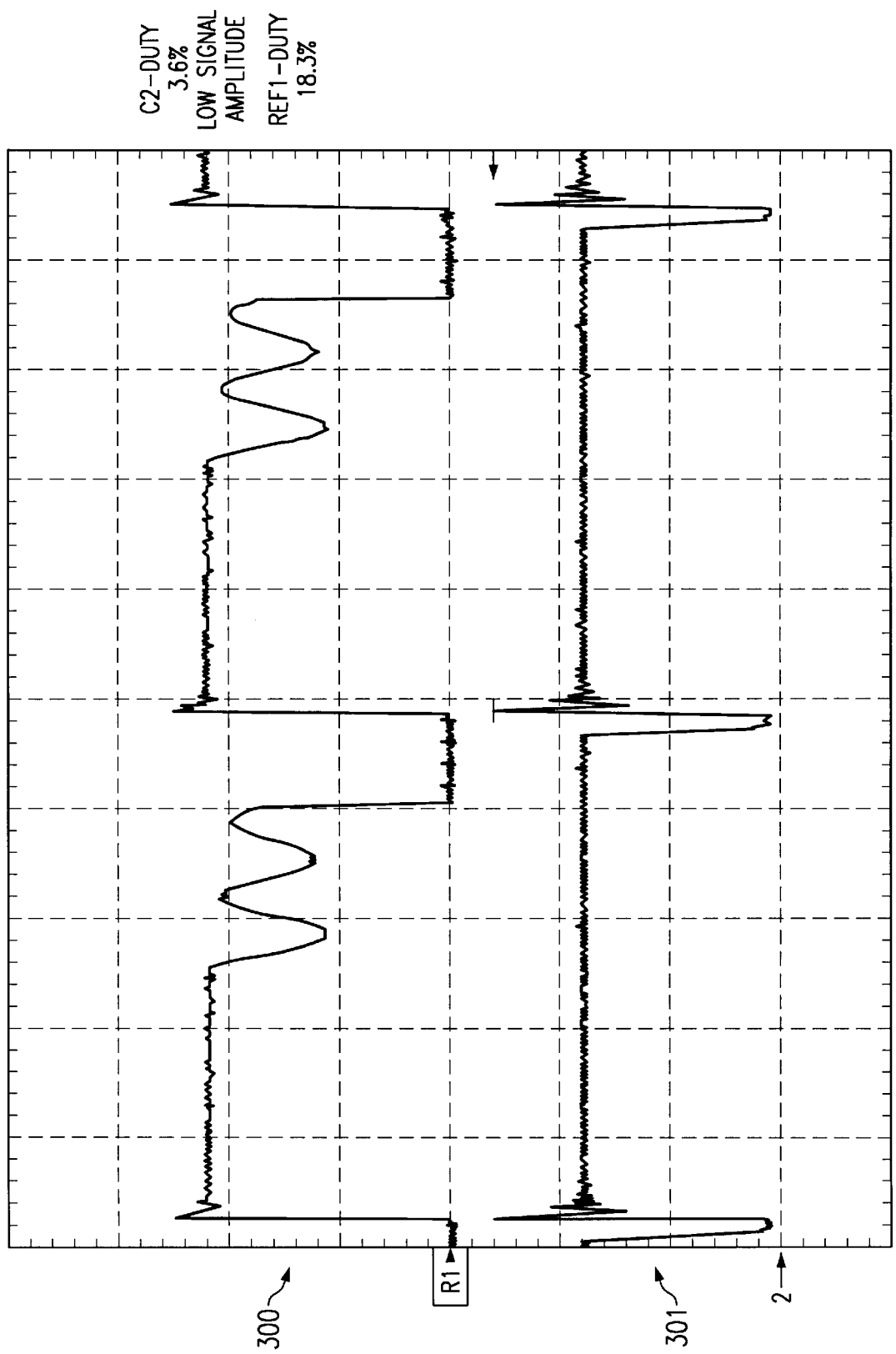
FIG. 3 shows overcurrent circuit waveforms during normal operation and when a fault occurs.

FIG. 3 shows overcurrent circuit waveforms during normal operation and when a fault occurs. Reference channel 300 shows the normal drain-source switching voltage waveform of transistor Q3 with a duty cycle of approximately 18.3%. Channel 301 shows a waveform obtained at the same node during an overcurrent fault condition. The duty cycle has changed to 3.6%, the result of which is a negligible heat dissipation of both the switching devices, transistor Q3 and diode CR3.

Figure 4:
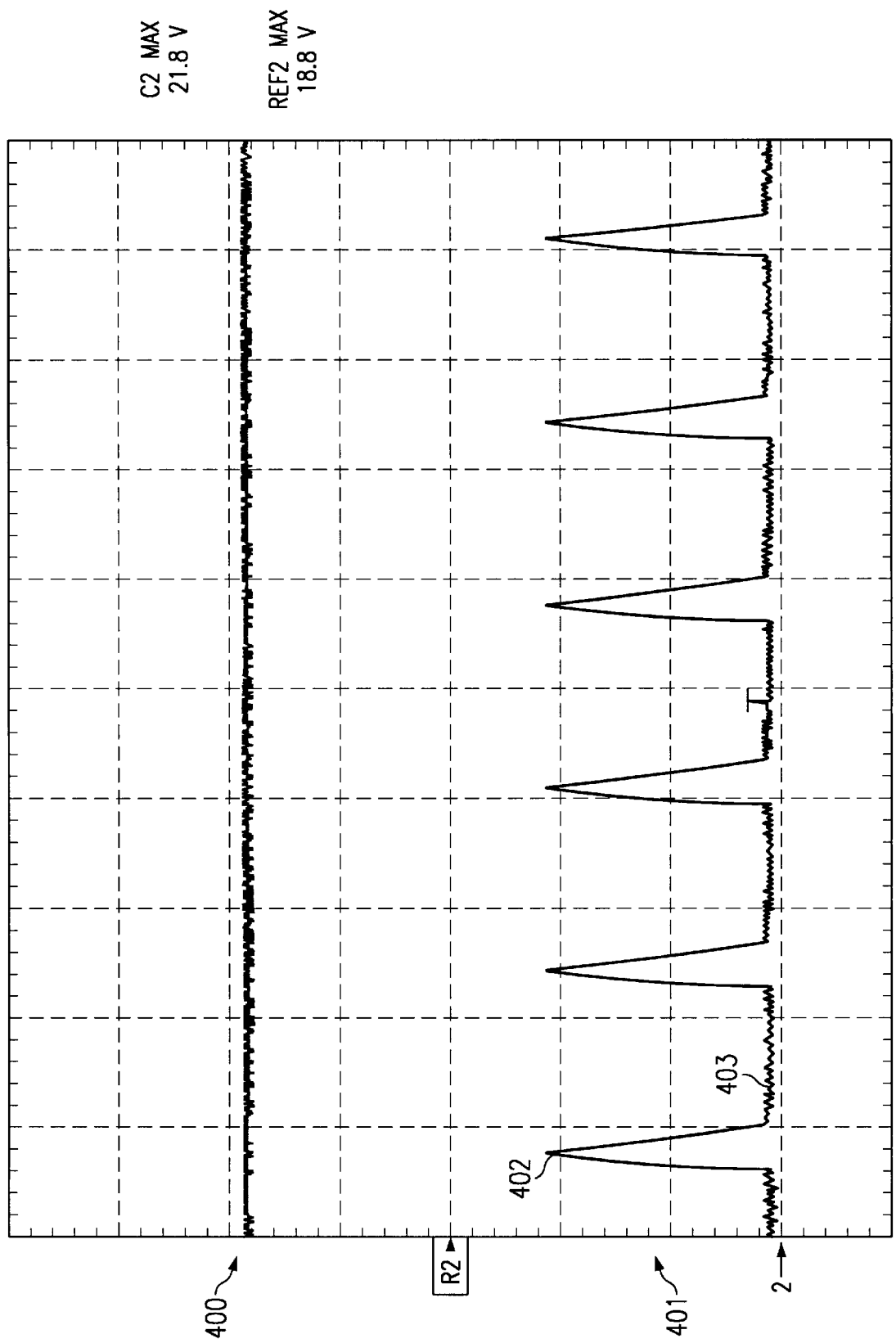
FIG. 4 shows overvoltage circuit waveforms during normal operation and when a fault occurs.

FIG. 4 shows overvoltage circuit waveforms during normal operation and when a fault occurs. Reference channel 400 shows the normal level of VOUT at approximately 18.8 volts. Channel 401 shows the output waveform during an overvoltage fault where the output voltage VOUT is limited to approximately 21.8 volts, and the converter cycles ON (402) and OFF (403).

According to a disclosed class of innovative embodiments, there is provided: a power supply circuit, comprising: a switched-mode power conversion circuit; a pulse-width modulator circuit operatively connected to apply drive pulses to operate said conversion circuit, and connected to be controlled by feedback signals received at a modulator voltage input and a modulator current input; and a latching circuit which is operatively connected to detect overvoltage, overtemperature, and overcurrent conditions in said power conversion circuit, and which is connected to shut down said modulator circuit by driving said modulator voltage input during an overvoltage or overtemperature condition, and connected to shut down said modulator circuit by driving said modulator current input during an overcurrent condition.

According to a another disclosed class of innovative embodiments, there is provided: a power supply protection circuit, comprising: a switched-mode power conversion circuit; a pulse-width modulator circuit operatively connected to apply drive pulses to operate said conversion circuit; a latch which is operatively connected to disable said modulator circuit whenever said latch is in a set condition; an overvoltage protection circuit connected to set said latch when an overvoltage condition occurs; an overtemperature protection circuit connected to set said latch when an overtemperature condition occurs; and an overcurrent protection circuit connected to set said latch when an overcurrent condition occurs.

According to a another disclosed class of innovative embodiments, there is provided: a method for overcurrent, overvoltage, and overtemperature protection in a power supply, comprising the steps of: (a.) providing a switched-mode power conversion circuit for (b.) operating said switched-mode power conversion circuit with a pulse-width modulator circuit; and (c.) disabling said modulator circuit with a latching circuit when said overvoltage, overtemperature, or overcurrent condition occurs.

According to a another disclosed class of innovative embodiments, there is provided: a computer system, comprising: a user input device, a microprocessor which is operatively connected to detect inputs from said input device, random-access memory which is connected to be read/write accessible by said microprocessor, and an output device operatively connected to receive outputs from said microprocessor; and a power supply connected to provide power to said computer system, said power supply comprising a switched-mode power conversion circuit; a pulse-width modulator circuit operatively connected to apply drive pulses to operate said conversion circuit, and connected to be controlled by feedback signals received at a modulator voltage input and a modulator current input; and a latching circuit which is operatively connected to detect overvoltage, overtemperature, and overcurrent conditions in said power conversion circuit, and which is connected to shut down said modulator circuit by driving said modulator voltage input during an overvoltage or overtemperature condition, and connected to shut down said modulator circuit by driving said modulator current input during an overcurrent condition.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the disclosed protection circuitry can be combined with many other PWM controller chips.

For example, the disclosed protection circuitry can also be used with converter topologies other than flyback, such as Forward Mode topologies and all derivatives thereof.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

What is claimed is:

1. A power supply circuit, comprising:

a switched-mode power conversion circuit;

a pulse-width modulator circuit operatively connected to apply drive pulses to operate said conversion circuit, and connected to be controlled by feedback signals received at a modulator voltage input and a modulator current input; and a latching circuit which is operatively connected to detect overvoltage, overtemperature, and overcurrent conditions in said power conversion circuit, and which is connected to shut down said modulator circuit by driving said modulator voltage input during an overvoltage or overtemperature condition, and connected to shut down said modulator circuit by driving said modulator current input during an overcurrent condition;

wherein said latching circuit comprises a bistable semiconductor device structure.

2. The circuit of claim 1, wherein said power supply circuit embodies flyback topology.

3. The circuit of claim 1, wherein said latching circuit cycles power on and off when in an overtemperature condition.

4. The circuit of claim 1, wherein said latching circuit cycles power on and off when in an overvoltage or overcurrent condition.

5. The circuit of claim 1, wherein said pulse-width modulator resets said latching circuit.

6. The circuit of claim 1, wherein said modulator, in response to said latching circuit, cycles on and off when an overtemperature condition occurs.

7. A power supply protection circuit, comprising:

a switched-mode power conversion circuit;

a pulse-width modulator circuit operatively connected to apply drive pulses to operate said conversion circuit;

a latch which is operatively connected to disable said modulator circuit whenever said latch is in a set condition;

an overvoltage protection circuit connected to set said latch when an overvoltage condition occurs;

an overtemperature protection circuit connected to set said latch when an overtemperature condition occurs; and an overcurrent protection circuit connected to set said latch when an overcurrent condition occurs;

wherein said latching circuit comprises a bistable semiconductor device structure.

8. The circuit of claim 7, wherein said power supply circuit embodies flyback topology.

9. The circuit of claim 7, wherein said latch cycles power on and off when in an overtemperature condition.

10. The circuit of claim 7, wherein said latch cycles power on and off when in an overvoltage or overcurrent condition.

11. The circuit of claim 7, wherein said pulse-width modulator resets said latch.

12. The circuit of claim 7, wherein said modulator, in response to said latch, cycles on and off when an overtemperature condition occurs.

13. A method for overcurrent, overvoltage, and overtemperature protection in a power supply, comprising the steps of:

(a.) providing a switched-mode power conversion circuit for (b.) operating said switched-mode power conversion circuit with a pulse-width modulator circuit; and (c.) disabling said modulator circuit with a latching circuit when said overvoltage, overtemperature, or overcurrent condition occurs;

wherein said latching circuit comprises a bistable semiconductor device structure.

14. The method of claim 13, wherein said power supply circuit embodies flyback topology.

15. The method of claim 13, wherein said latching circuit cycles power on and off when in an overtemperature condition.

16. The method of claim 13, wherein said latching circuit cycles power on and off when in an overvoltage or overcurrent condition.

17. The method of claim 13, wherein said pulse-width modulator resets said latching circuit.

18. The method of claim 13, wherein said modulator, in response to said latching circuit, cycles on and off when an overtemperature condition occurs.

19. A computer system, comprising:

a user input device, a microprocessor which is operatively connected to detect inputs from said input device, random-access memory which is connected to be read/write accessible by said microprocessor, and an output device operatively connected to receive outputs from said microprocessor; and a power supply connected to provide power to said computer system, said power supply comprising a switched-mode power conversion circuit;

a pulse-width modulator circuit operatively connected to apply drive pulses to operate said conversion circuit, and connected to be controlled by feedback signals received at a modulator voltage input and a modulator current input; and a latching circuit which is operatively connected to detect overvoltage, overtemperature, and overcurrent conditions in said power conversion circuit, and which is connected to shut down said modulator circuit by driving said modulator voltage input during an overvoltage or overtemperature condition, and connected to shut down said modulator circuit by driving said modulator current input during an overcurrent condition;

wherein said latching circuit comprises a bistable semiconductor device structure.

20. The system of claim 19, wherein said power supply circuit embodies flyback topology.

21. The system of claim 19, wherein said latching circuit cycles power on and off when in an overtemperature condition.

22. The system of claim 19, wherein said latching circuit cycles power on and off when in an overvoltage or overcurrent condition.

23. The system of claim 19, wherein said pulse-width modulator resets said latching circuit.

24. The system of claim 19, wherein said modulator, in response to said latching circuit, cycles on and off when an overtemperature condition occurs.

* * * * *